H. H. Hatheway.
Grappling Hook.
N° 97,636. Patented Dec. 7, 1869.
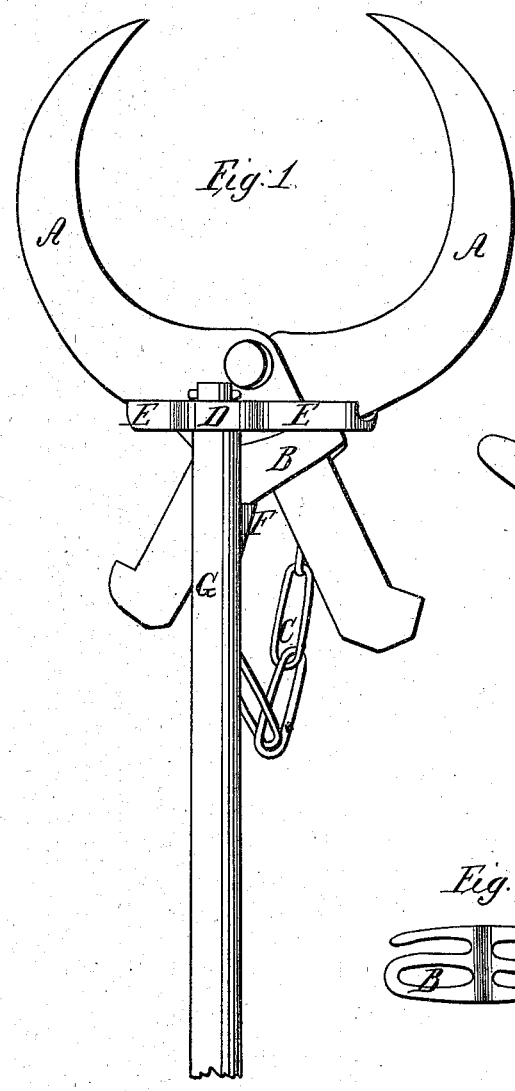
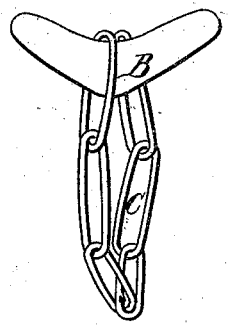
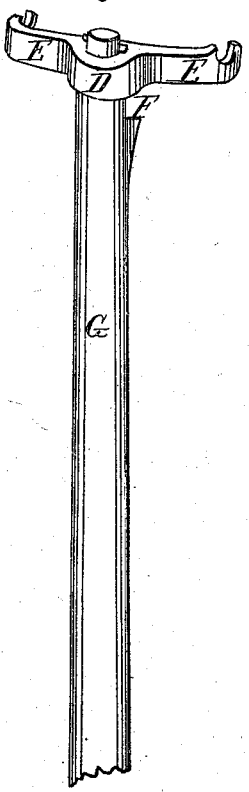
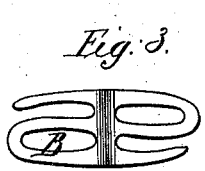
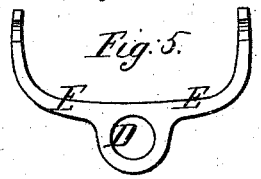
Witnesses;
Ch. A. Spencer
O. D. Wray
Inventor;
H. H. Hatheway

United States Patent Office.

HENRY H. HATHEWAY, OF CLOCKVILLE, NEW YORK.

Letters Patent No. 97,635, dated December 7, 1869.

IMPROVEMENT IN GRAPPLING-HOOKS.

The Schedule referred to in these Letters Patent and making part of the same.

*To all whom it may concern:*

Be it known that I, HENRY H. HATHEWAY, of Clockville, in the county of Madison, and State of New York, have invented a new and valuable Improvement in Grappling-Hooks for horse hay-forks; and I do hereby declare that the following is a full, clear, and exact description of the construction and operation of the same, reference being had to the annexed drawings, making a part of this specification, and to the letters and figures of reference marked thereon.

Figure 1, of the drawings, represents a perspective view of my device in the act of being elevated to a beam or other support.

Figure 2 represents a side view of the sliding collar, with chain attached.

Figure 3 represents a top view of the same.

Figure 4 represents a perspective view of the ferrule, with pole attached.

Figure 5 represents a top view of the ferrule and its arms.

Similar letters of reference on the drawings indicate like parts.

My invention relates to means for fastening the grappling-hooks of horse hay-forks to beams, rafters, or other high supports, without the use of ladders; and consists, mainly, in the arrangement of the sliding collar on the shanks of the grappling-hook, and in the construction of the ferrule, and pin-or projection on the elevating-pole.

The letters A A denote the jaws of the grappling-hook.

B, the sliding collar, fixed on the shanks of the hook, in such a manner that it can slide up and down thereon.

D, the ferrule, secured to the end of the elevating-pole, and formed with the horizontally-curved arms E E, extending out from it on each side, and having notches to receive the back edges of the jaws of the hook when open.

F, a hook, pin, or projection on the pole G, below the ferrule, in such a position that it will catch under the sliding collar, and raise it when the pole is elevated.

The pole is made movable in the ferrule, so that the pin or projection F can be turned from under the sliding collar B, when desired.

The hay-fork is suspended by a chain or rope from the sliding collar.

The grappling-hook, sliding collar, and ferrule, are generally to be made of wrought or malleable iron, or other suitable metal.

The sliding collar should be placed on the shanks of the hook before the jaws are riveted together, such a form being given to the ends of the shanks as will prevent the collar from being removed.

The operation of my grappling-hook and attachments may be thus described:

The back edges of the jaws are placed in the notches of the arms E E of the ferrule, and the pole G turned so that the sliding collar B will rest on the pin or projection F, the weight of the hook causing the shanks to drop through the collar as far as possible, thereby opening the jaws to their widest extent.

The pole, with the hook securely supported thereon, is now elevated until the jaws span the beam or rafter to which it is to be attached.

The pole is now turned in the ferrule sufficiently to remove the pin or projection from under the sliding collar, which, actuated by its own weight and that of the pendant hay-fork, falls on the shanks, closing them, and thereby causing the jaws to engage the rafter. The pole and its ferrule may now be removed, and the more weight applied to the sliding collar, the firmer will be the grasp of the hook.

When it is desired to remove the grappling-hook from the beam, the pole and ferrule are applied in such a manner, that the pin F, engaging under the sliding collar, raises it, thereby opening the jaws, so that they will fall back into the notches of the ferrule, when the hook may be safely taken down.

I am aware that adjustable automatic clutches or grappling-hooks, for suspending horse hay-forks, have been used before; and I am also aware that devices for raising and lowering such clutches and grappling-hooks have been employed; therefore I do not claim such, broadly; but, having thus described my invention,

What I claim, and desire to secure by Letters Patent, is—

In combination with a grappling-hook, A, the sliding collar B, ferrule D, with horizontally-curved and notched arms E E, and pole G, provided with the hook, pin, or projection F, all constructed and arranged to operate as specified.

H. H. HATHEWAY.

Witnesses:
JOHN H. FANCHER,
J. L. MANSFIELD.